Figure 1:
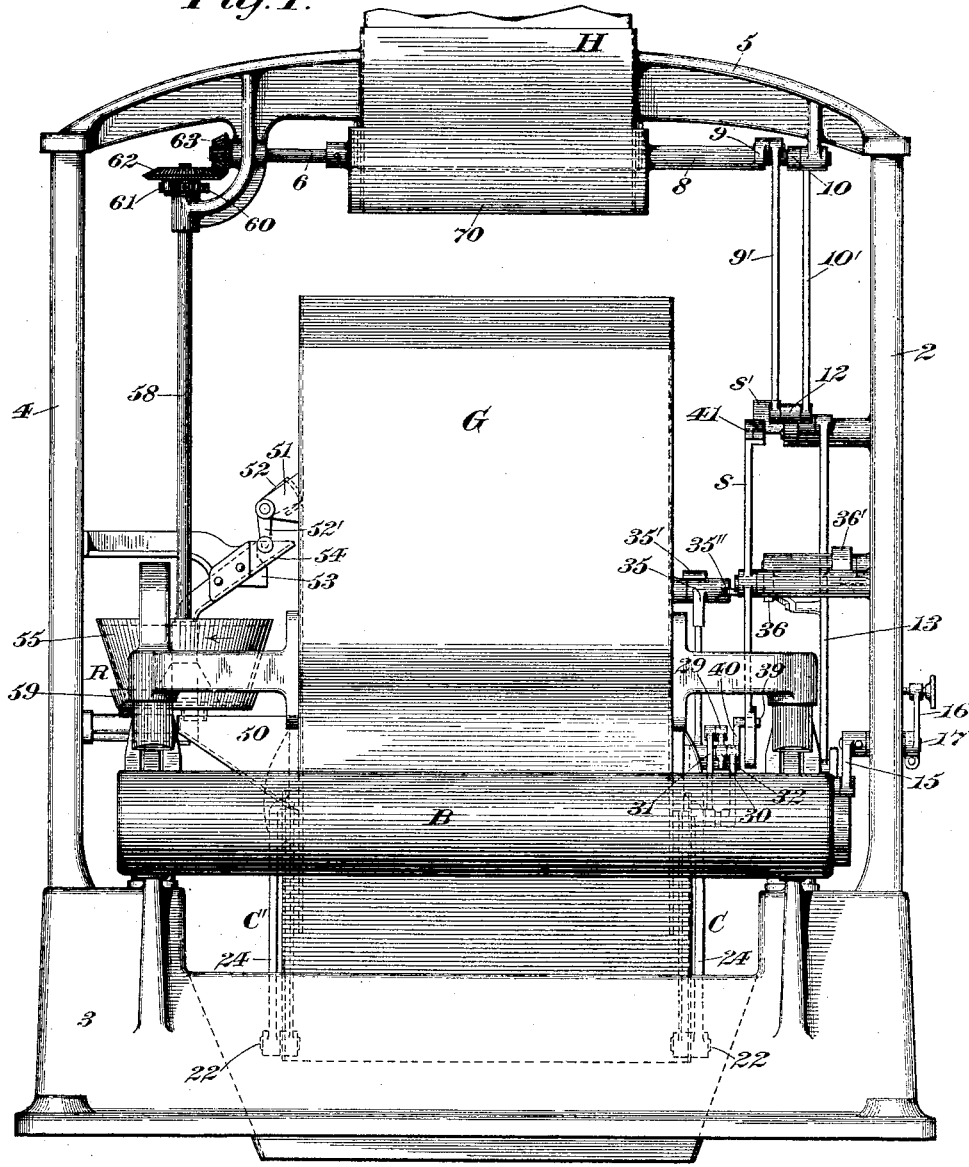

(No Model.)  5 Sheets—Sheet 1.

F. H. RICHARDS.
AUTOMATIC WEIGHING MACHINE.

No. 600,041. Patented Mar. 1, 1898.

Witnesses:
Inventor:

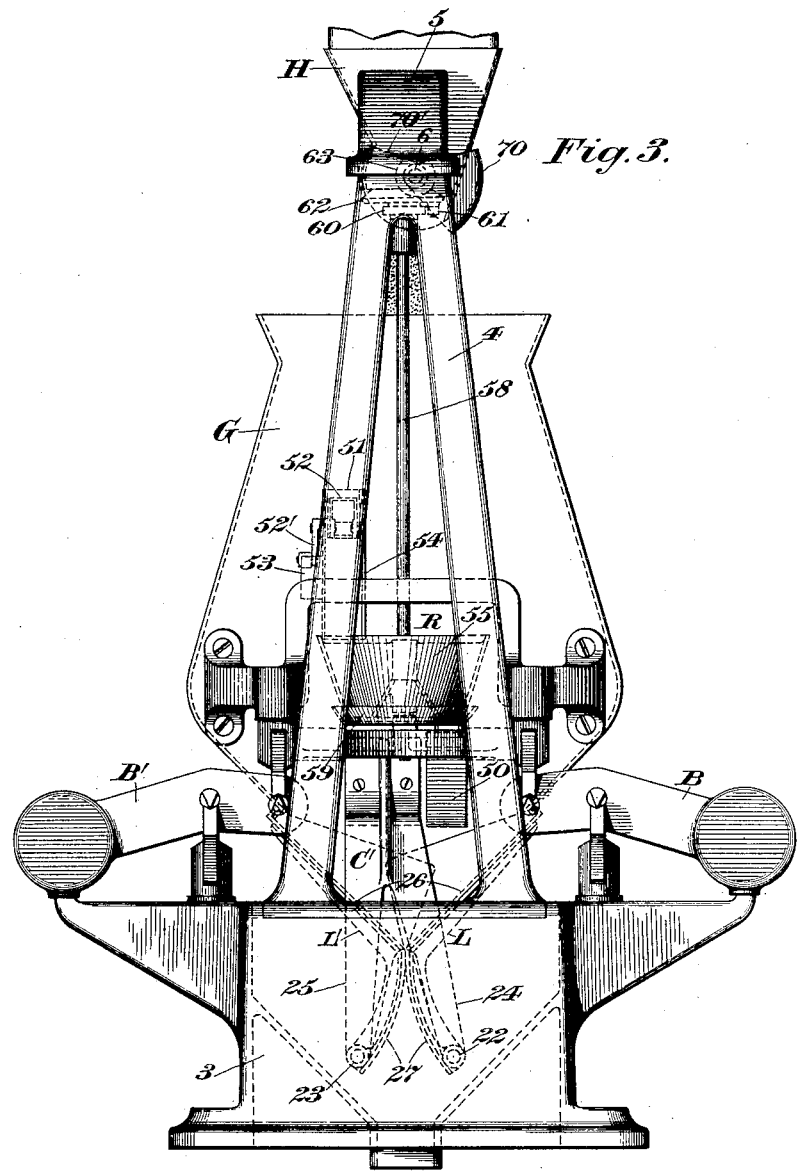

(No Model.)

F. H. RICHARDS.
AUTOMATIC WEIGHING MACHINE.

No. 600,041. Patented Mar. 1, 1898.

Witnesses:
O. W. Smith
J. L. Edwards Jr.

Inventor:
F. H. Richards (No Model.)  
5 Sheets—Sheet 4.

F. H. RICHARDS.
AUTOMATIC WEIGHING MACHINE.

No. 600,041.  
Patented Mar. 1, 1898.

Witnesses;  
Inventor;

(No Model.)  5 Sheets—Sheet 5.

F. H. RICHARDS.
AUTOMATIC WEIGHING MACHINE.

No. 600,041.  Patented Mar. 1, 1898.

Witnesses;
O. W. Smith
J. L. Edwards Jr.

Inventor:
F. H. Richards

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 600,041, dated March 1, 1898.

Application filed August 12, 1897. Serial No. 648,069. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to that class of automatic weighing-machines known as "rising-poise" machines—that is, machines in which an overload of material is first supplied to the load-receiver or bucket of the weighing-machine and in which the surplus material is subsequently removed to bring the load-receiver or bucket and weighing mechanism to a true poise and after which the closer of the load-receiver is opened and the completed load discharged—as described, for instance, in Letters Patent of the United States No. 572,067, granted to me November 24, 1896, to which reference may be had.

One object of my present invention is to provide in an automatic weighing-machine embodying a load-receiver improved overload-supplying means, surplus-discharging means, completed-load-discharging means, and surplus-resupplying means, all of which operate in the order named, and the latter of which includes a rotative multicompartment receiver operative with the overload-supplying means, whereby the material may be weighed with facility and rapidity and with an accuracy equal to hand-weighing.

A further object of the invention is to provide, in connection with weighing mechanism including a load-receiver, overload-supplying means and alternately-effective load-reducing means and resupplying means, the former of which includes a valve controlled by the weighing mechanism, and the latter of which includes a rotary auxiliary load-receiver operative with the overload-supplying means, and also to provide means for blocking the effective operation of the resupplying means during the weighing operation and for releasing and facilitating a resupplying movement of said means subsequent to the discharge of the completed load from the load-receiver and preparatory to the making up of a new load.

A further object of the invention is to provide, in connection with the load-receiver of the weighing-machine, improved load-discharging instrumentalities operative with the weighing mechanism and comprising two oppositely-disposed closers or discharge members pivotally supported at their lower ends at points below and at opposite sides, respectively, of the longitudinal axis of the load-receiver and so constructed and organized that during the opening movement thereof the upper ends of the closers will travel in arcs toward a common point of intersection located below the load-receiver.

Figure 2:
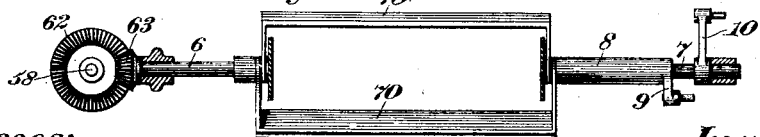
Figures 5, 6:
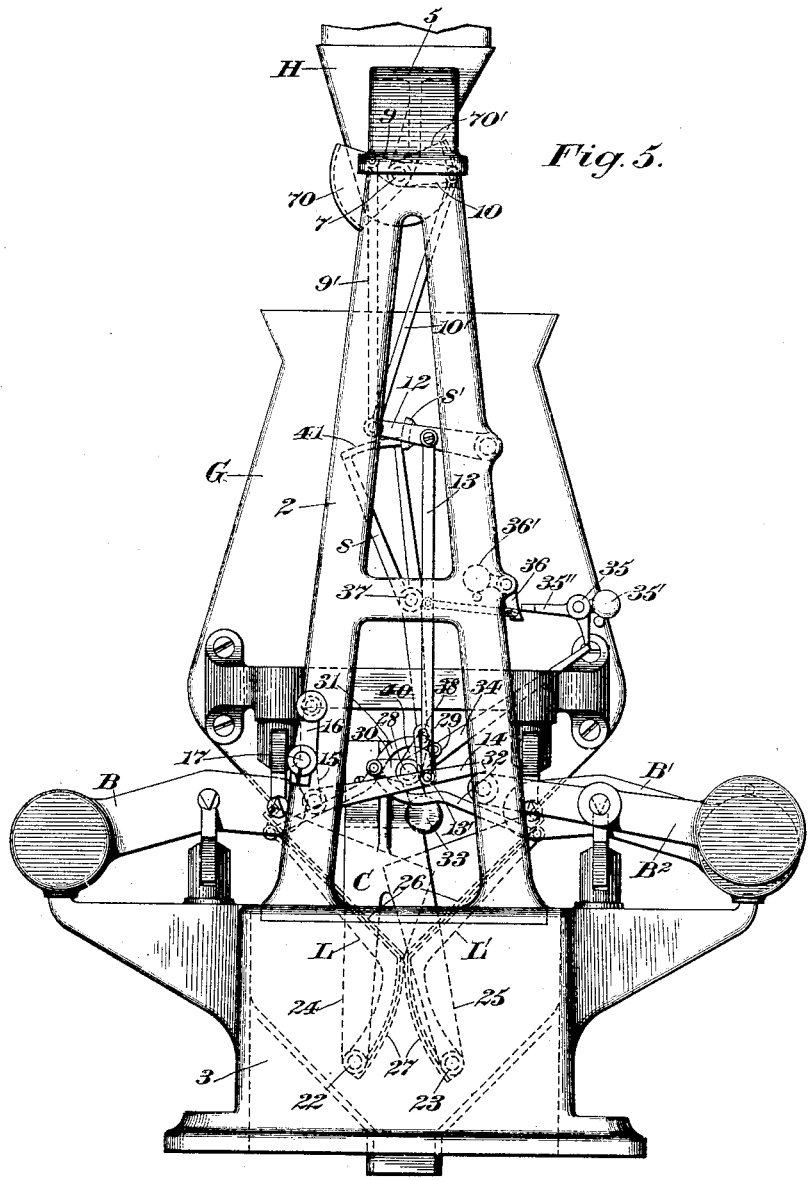
Figure 7:
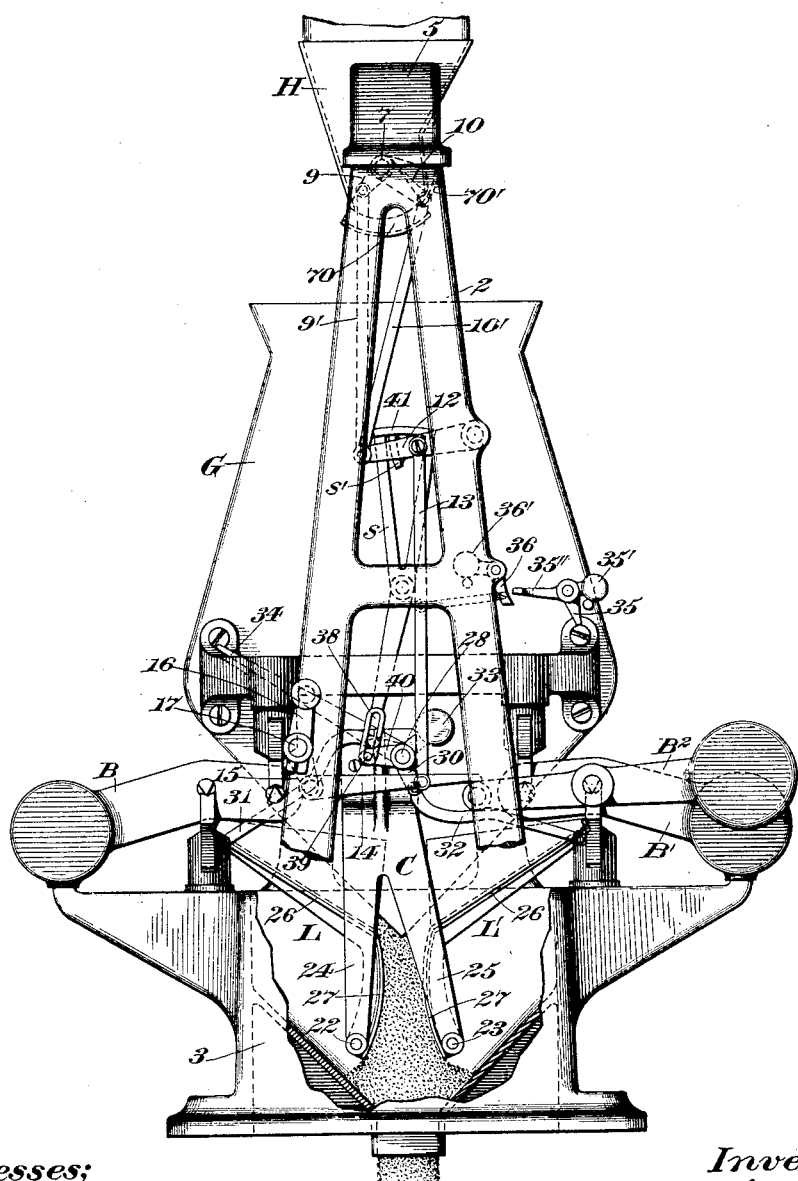
Figure 12:
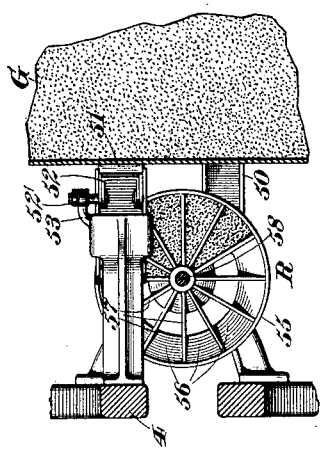
Figure 13:
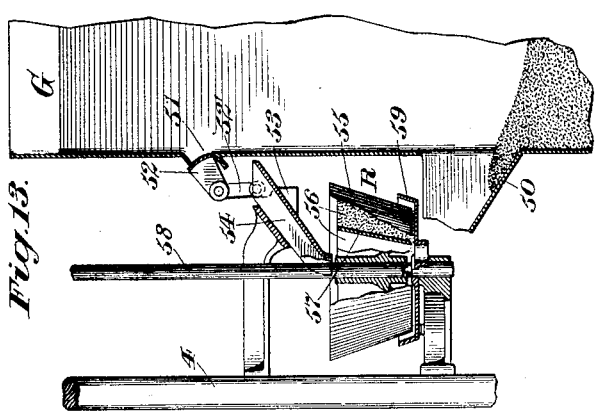
Figure 10:
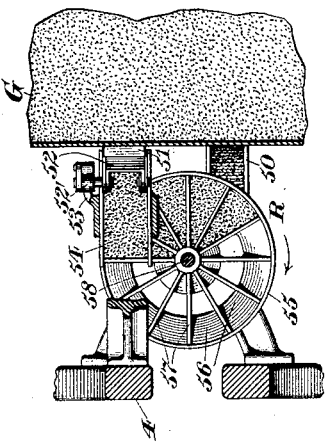
Figure 11:
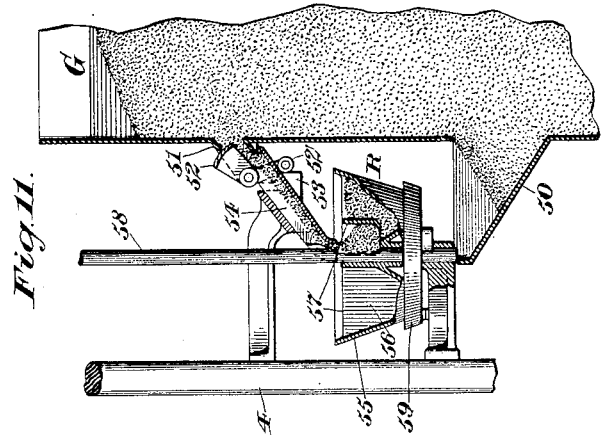
Figure 8:
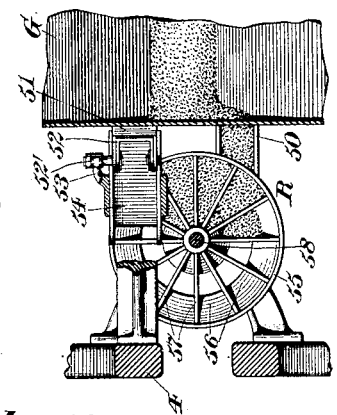
Figure 9:
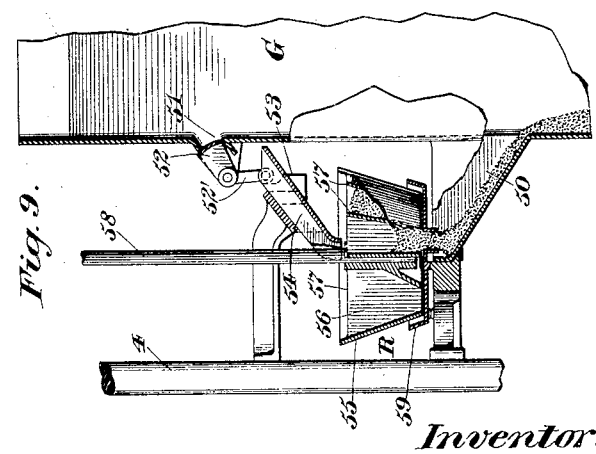

In the drawings accompanying and forming part of this specification, Figure 1 is a front elevation of a weighing-machine embodying my present improvements, the stream-controller or main supply-valve being in its open or overload-supplying position, the bucket or load-receiver being in its normal load-receiving position, and the load-reducing valve being in its closed position. Fig. 2 is a plan view, partially in section, of the main stream-controller and a portion of the actuating mechanism for the rotative transferring-receiver. Fig. 3 is a side elevation of the machine as seen from the left-hand in Fig. 1, the parts being in positions corresponding to those illustrated in said Fig. 1. Fig. 4 is a plan view, partially in horizontal section, of a portion of the left-hand side of the machine as seen in Fig. 1, showing parts of the load-reducing and resupplying instrumentalities. Fig. 5 is a side elevation of the weighing-machine as seen from the right hand in Fig. 1, the parts of the machine being in the positions they occupy during the supply of an overload to the bucket. Fig. 6 is a perspective detail of a portion of the connection between the closer members of the receiver. Fig. 7 is a side elevation similar to Fig. 5, partially in section, of the weighing-machine, showing the valve or stream-controller of the main supply apparatus in its closed position, the load-receiver in its elevated position, and the load-discharging devices in their load-discharging positions. Figs. 8 and 9 are sectional plan and side views, respectively, of portions of the load-receiver and the load-reducing and resupplying mechanism, showing these parts in the positions they occupy after the load-receiver has discharged a completed load and during the reconveyance and resupplying of a portion of the surplus to said load-receiver. Figs. 10 and 11 are sectional and plan views similar to Figs. 8 and 9 of the same parts, showing the operation of the load-reducing means; and Figs. 12 and 13 are sectional plan and side views similar to Figs. 10 and 11, showing the same parts in the positions they occupy during the discharge of a completed load from the load-receiver or bucket.

Similar characters designate like parts in all the figures of the drawings.

My present invention is in the nature of an improvement upon that described in the Patent No. 572,067, hereinbefore referred to, and for the purpose of illustrating the construction, organization, and mode of operation of the several elements comprising my present invention they are shown in connection with weighing mechanism which is in a general way similar to that shown and described in Letters Patent of the United States No. 572,071, granted to me November 24, 1896, to which reference may be had.

The framework for supporting the operative parts of the machine may be of any suitable construction, and it is herein shown consisting of the end frames or columns 2 and 4, mounted upon the chambered supporting-base 3, into which the completed loads are discharged from the load-receiver or bucket, said columns 2 and 4 being surmounted by the top plate 5 in the usual manner. The supply chute or hopper is shown at H, said chute or hopper being formed integral with the top plate 5.

The automatic weighing mechanism comprises a suitable load-receiver, in which the loads or charges of material are made up, and that herein shown consists of the bucket G, similar in a general way to the well-known "single-chambered" class.

For sustaining the bucket I have shown beam mechanism of the "duplicate" class, consisting of the counterweighted scale-beams B and B', fulcrumed on the base 3 and provided with suitable knife-edges on the poising sides thereof for supporting the bucket.

The stream-controller for governing the supply of material to the bucket may be of any suitable type. In the form thereof herein shown it comprises two oppositely-disposed gravitative scoop valves or members 70 and 70', one of which is fixed at one end to a rock-shaft section 6 and is pivotally supported at its opposite end upon a rock-shaft section 7, which sections have their axes in alinement and are journaled in suitable bearings on the framework. The other valve member is fixed at one end to the rock-shaft section 7 and is pivotally supported at its opposite end upon the shaft-section 6, as will be understood by reference to Figs. 1 and 2 of the drawings. The first-mentioned valve 70 has at one end thereof an elongated sleeve 8, that surrounds the shaft-section 7, which sleeve is furnished, at the outer end thereof, with a crank-arm 9, and the shaft-section 7 is shown furnished with a crank-arm 10, which extends outward in opposition to the crank-arm 9 of the valve 70.

The chute H and stream-controlling valves 70 and 70' in the present invention constitute what will be hereinafter termed, collectively, the "overload-supplying means."

The bucket G is provided, at the lower discharge end thereof, with a load-discharger comprising two closers, which are designated in a general way by L and L', the construction, organization, and operation of which will be hereinafter fully described.

As a convenient means for actuating the valve members 70 and 70' to impart an opening movement thereto immediately after the closers L and L' of the bucket are shut I have provided a valve-opening actuator, which in the preferred form thereof shown most clearly in Figs. 5 and 7 of the drawings comprises two thrust-rods 9' and 10', pivotally connected at their upper ends to the crank-arms 9 and 10, respectively, of the valve members 70 and 70', and pivotally connected at their lower ends to one end of a stop-carrying arm 12, which is pivotally supported at its opposite end on the framework, a thrust-rod 13, pivotally connected at its upper end to the stop-carrying arm 12, intermediate the ends thereof, and pivotally connected at its lower end at 13' to a throw-out lever 14, which normally bears at one end thereof upon the poising end of a counterweighted auxiliary beam $B^2$, operative with the beam B' of the weighing mechanism, and which lever is pivotally connected at the opposite end to the crank-arm 15 of a hand-lever 16, pivotally supported at 17 on the frame of the machine, the construction and organization of these parts being such that on the descending movement of the load-receiver the thrust-rods of the valve-opening actuator will gradually descend, allowing the valve members to close by their own gravity, and on the ascending movement of said load-receiver and after the shutting of the closers L and L' an upward thrust will be imparted to the thrust members 13, 9', and 10' through the medium of the counterweighted auxiliary beam and cause a complete closure of the valve members 70 and 70'.

For the purpose of preventing the discharge of the load from the bucket while the valve members 70 and 70' are in their open positions and in order to retain the valve members 70 and 70' closed while the load-discharger is open I employ interlocking mechanism, which in the preferred form thereof shown in the drawings comprehends two reciprocally-effective stop members, (designated by $s$ and $s'$, respectively,) one of which, as $s$, is controlled in its movements for blocking and releasing the stream-controller by means connected with the closers L and L', and the other of which, as $s'$, is controlled in its movements for blocking and releasing the closers L and L' by the valve-opening actuator, as will be hereinafter more fully described.

In the preferred form thereof shown in the drawings the side walls of the load-receiver or bucket G are V-shaped, and the bottom walls are located in relatively oblique planes, having their points of intersection substantially coincident with the longitudinal center of the load-receiver, said bottom walls being cut away at their lower ends, as indicated in Fig. 7 of the drawings, to provide an opening through which the material of the load-receiver may be discharged.

The load-discharging means in the preferred form thereof shown most clearly in Fig. 7 of the drawings comprises two oppositely-disposed angular closers L and L'. These closers are pivotally supported at 22 and 23 below and at opposite sides, respectively, of the longitudinal axis of the load-receiver on depending arms 24 and 25 of closer-supporting brackets C and C', fixed to opposite side walls, respectively, of the load-receiver, near the lower ends thereof.

Each closer in the preferred form thereof shown in the drawings comprises a flat material-supporting plate 26, which when the closer is shut extends outwardly in an oblique plane relatively to the longitudinal axis of the bucket or load-receiver and parallel to the line of the bottom wall of the receiver, and a conjugated curved regulator-plate 27, which when said receiver is in its shut position diverges from the lower central line of said receiver.

The closers L and L' are so supported and constructed that on the opening movement thereof the upper ends of the material-supporting plates will travel outwardly and downwardly in arcs which intersect at a point below and in substantially vertical alinement with the longitudinal axis of the load-receiver, as will be readily understood by a comparison of Figs. 5 and 7 of the drawings.

On the closing movement of the closers L and L' the two material-supporting plates of said closers move toward each other in arcs concentric to their respective axes until the upper portions of the curved regulator-plates of said closers come into contact and the material-supporting plates of said closers cover the discharge-opening of the bucket G.

By pivotally supporting the two closers L and L' below and at opposite sides, respectively, of the longitudinal axis of the load-receiver or bucket it will be seen that the said closers L and L' practically constitute a regulator-hopper having inclined guide-walls and a discharge-conduit the area of the upper end of which is variable by the movements of the closers, but the area of the lower end of which is constant.

For the purpose of insuring unitary movements of the closers L and L' a rock-shaft 28 is shown supported in a bearing on the closer-supporting bracket C, near the upper end thereof, to which rock-shaft is fixed two oppositely-disposed crank-arms 29 and 30, to the outer ends of which are pivotally secured closer-sustaining links or connectors 31 and 32, which are pivotally connected at their outer ends to the upper ends of the closers L and L', respectively. This rock-shaft 28 also has fixed thereto a counterweighted closer-shutting arm 33, so disposed with relation to the crank-arms 29 and 30 as to exert a closing stress upon the closer-sustaining links 31 and 32.

For the purpose of locking the closers normally in their closed positions the rock-shaft 28 has fixed thereon a by-pass arm 34, which when the closers are shut engages a by-pass latch 35, pivotally supported on the load-receiver and having a counterweight 35' for retaining the same normally in engagement with the by-pass arm, a stop being provided for limiting the movement of the by-pass latch.

As a convenient means for actuating the by-pass latch to release the same from engagement with the by-pass arm a gravitative latch-tripper 36 is provided, which latch-tripper is pivotally supported on the framework and has a counterweight 36' for retaining the latch-tripping end thereof normally in vertical alinement with the outer end of an arm 35" on the by-pass latch, said latch-tripper permitting a free movement of the by-pass latch during the descending movement of the load-receiver and acting to disengage the latch from the by-pass arm at a predetermined point in the ascending movement of the load-receiver, as will be readily understood by reference to Figs. 5 and 7 of the drawings.

As a convenient means for preventing the opening movement of the closers L and L' when the stream-controller of the overload-supplying means is in its open position two coöperative stop members (designated by $s$ and $s'$) are provided, the one, $s$, of which is in the nature of a vertically-disposed lever fulcrumed intermediate its ends, as at 37, on the framework and having an elongated slot 38 at the lower end thereof, through which extends a pin 39 on the crank-arm 40, fixed to the rock-shaft 28, to which the closer-sustaining links are connected, the upper end of said member or lever $s$ having a curved stop-flange 41, concentric to the axis of movement of said lever, and the other stop member, $s'$, being in the nature of a vertically-disposed curved plate or flange preferably formed integral with the stop-carrying arm 12 and whose opposite ends are adapted to alternately engage the upper and lower faces, respectively, of the curved stop-plate 41 of the other stop member $s$. These two stop members $s$ and $s'$ are so disposed relatively to each other and operate in such manner that when the closers L and L' are open the stop member $s$ will prevent an opening movement of the stream-controller, (see Fig. 7,) and when the stream-controller is open the stop member $s'$ will block the opening movement of the closers L and L'. (See Fig. 5.)

On the closing movement of the closers L and L' it will be seen that the stop member $s$ is shifted, through the medium of the crank-arm 40 in connection with the shaft 28, from the position shown in Fig. 7 to that shown in Fig. 5, thus releasing the stop $s'$ and permitting an opening movement of the valve members 70 and 70' through the medium of its connections with the auxiliary beam B², which beam drops from the position shown in Fig. 7 to that shown in Fig. 5 immediately after the flange of the stop member $s$ is thrown out of operative engagement with the stop-plate of the stop member $s'$, as will be readily understood by a comparison of these figures. The shaft 28 is operated to throw the stop member $s$ out of engagement with the stop member $s'$ by the counterweighted arm, which constitutes a closer-shutting actuator.

The bucket G is shown furnished intermediate the receiving and discharging ends thereof with two conduits or spouts 50 and 51, which communicate through the side wall thereof with the interior of said bucket and are located one above and at one side of the other, which conduits may, on account of their functions, be consistently termed the "surplus-discharger" and "surplus-receiver," respectively, the upper surplus-discharger 51 extending downwardly in an inclined plane and the surplus-receiving conduit extending upwardly in an inclined plane.

The lower or surplus-receiving conduit is shown somewhat in the nature of a chute open at its upper end, and the upper conduit 51 is shown provided with a counterweighted valve 52, which is pivoted thereon and is adapted for controlling the discharge of material through this conduit, this valve being so counterweighted as to retain the same normally closed and being provided with a depending actuating-arm 52', adapted for coöperating with a valve-actuator during the movement of the bucket.

As a means for actuating the valve 52, which for convenience is termed the "load-reducing" valve, I have provided a valve-actuator, which in the preferred form thereof shown most clearly in Figs. 8 to 13 of the drawings is in the nature of a bracket having a cam or cam-face plate 53, located in the path of vertical movement of the valve-actuating arm 52', this bracket being preferably fixed to one of the uprights of the framework, as shown in said figures, and having at the valve-actuating end thereof a support for a trough 54, whose receiving end is located below and in position to receive the material from the surplus-discharging conduit 51.

The conduit 51, its valve, and valve-actuating means constitute what is herein termed the "load-reducing means," and the receiving-conduit 50 constitutes one element of what is herein termed the "resupplying means."

The valve-actuating cam 53 is so constructed and is so disposed with relation to the load-reducing valve 52 as to engage and impart an opening movement to the valve immediately after the bucket has arrived at a predetermined point in its descending movement, it preferably actuating said valve immediately after the receiver arrives at its poised position and retaining the valve in its open position until sufficient material has been discharged through the surplus-discharge conduit to cause the bucket to rise to its true-poise position.

For the purpose of receiving and dispensing the surplus material after its discharge from the load-receiver I have provided a transferring-receiver, which is designated in a general way by R and which in the preferred form thereof shown most clearly in Figs. 1 and 8 to 13 of the drawings comprises a multicompartment annular receptacle 55, open at its upper and lower ends and divided radially into a series of compartments 56 by partitions 57, which receptacle is fixed to and is rotated with a vertically-disposed actuating-shaft 58, journaled at its upper and lower ends in suitable bearings, and a feed-plate 59, fixedly supported below and practically constituting the bottom of the receptacle 55, said feed-plate having a discharge-opening therethrough which is located in vertical alinement with the receiving-conduit 50 and registers with the compartments of the receptacle 55 successively during the rotative movement of said receptacle. The compartments 56 have their outer and inner walls preferably inclined toward each other at their lower ends, as shown most clearly in Fig. 9 of the drawings.

The discharge end of the trough 54 of the discharge-conduit is located above and at one side of the axis of rotation of the receptacle 55 in position to discharge material into the successive compartments of said receptacle, and the conduit 50 has its receiving end located below and at the opposite side of the axis of movement of said receptacle 55, so that the material is received in the receptacle 55 at one side of the axis and is discharged therefrom at the diametrically opposite side of said axis, thus necessitating a semirotation of the receptacle before material received in one compartment thereof is discharged from said compartment.

In practice it is desirable that the surplus material contained in the bucket be discharged during the descending movement of said bucket and during the weighing operation and that said surplus be reconveyed or resupplied to said bucket subsequent to the discharge of the completed load from said bucket and before or during the making up of a new load, and to accomplish this end it is preferable to impart an opening movement to the load-reducing valve during the descending movement of the load-receiver below its poising-point, prevent a resupplying movement of the transferring-receiver 55 during the weighing operation, or until the completed load is discharged and the closers of the bucket have returned to their normal shut position, and to impart a resupplying movement to said transferring-receiver immediately after said closers or load-dischargers have returned to their closed positions and simultaneously with the opening movement of the valve or stream-controller of the overload-supplying means.

As a convenient means for imparting intermittently a rotative movement to the transferring-receiver 55 simultaneously with the opening movement of the stream-controller of the overload-supplying means the vertically-disposed receiver-actuating shaft 58 is furnished at the upper end thereof, preferably, with a ratchet-wheel 60, which has fixed thereto and is connected in one direction by a spring-held pawl 61, carried on a bevel-gear 62, which meshes with a bevel-gear 63, fixed to the stream-controller valve or member 70, this connection being such that during the opening movement of the valve 70 an effective movement will be imparted to the transferring-receiver 55 through the medium of the pawl and ratchet, and during the closing movement of said valve the pawl 61 will ride over the teeth of the ratchet without imparting any movement to the receiver 55.

The effective movement of the transferring-receiver 55 is blocked during the weighing operation through the means which block the opening movement of the stream-controller of the overloading means.

It will be obvious that the means for actuating the transferring-receiver 55 may be variously modified within the purview of this invention.

Having described my invention, I claim—

1. The combination, with weighing mechanism including a load-receiver and with overload-supplying means, of alternately-effective load-reducing means and resupplying means, the former of which includes a stream-controller or valve operative with the weighing mechanism, and the latter of which includes a rotary auxiliary receiver operatively connected to, and actuated by, the overload-supplying means.

2. The combination, with weighing mechanism including a load-receiver and with overload-supplying means, of load-reducing and resupplying means including a horizontally-rotative auxiliary receiver, and means operative with the overload-supplying means for intermittently rotating said auxiliary receiver.

3. The combination, with weighing mechanism including a load-receiver and with overload-supplying means including an oscillatory stream-controller, of means operative with the weighing mechanism for actuating the stream-controller; load-reducing and resupplying means including a rotary auxiliary receiver; and actuating means connecting the rotary receiver with the stream-controller, and effective on each opening movement of said controller for imparting rotative movement to the auxiliary receiver.

4. The combination, with weighing mechanism including a load-receiver, of overload-supplying means; surplus-discharging means; and surplus-reconveying means operative in the order named, and the latter of which includes a rotary receiver positively operated by a member of the overload-supplying means.

5. The combination, with weighing mechanism including a load-receiver having a closer for controlling the discharge of the load, of overload-supplying means; surplus-discharging means; closer-actuating means; and surplus-reconveying means, all of which elements are operative in the order named, and the latter element of which includes a rotative surplus-receiver positively actuated by a member of the overload-supplying means after the closer is in its closed position.

6. In an automatic weighing-machine, the combination, with a load-receiver or bucket, of instrumentalities operative in the sequential order named—viz., overload-supplying means, surplus-discharging means, load-discharging means, and surplus-reconveying means, the latter of which includes a rotary receiver positively and intermittently actuated by a member of the overload-supplying means.

7. In an automatic weighing-machine, the combination, with a load-receiver or bucket, of instrumentalities operative in the sequential order named—viz., overload-supplying means, surplus-discharging means, load-discharging means, and surplus-reconveying means including a horizontally-rotative surplus-receiver operative by a member of the overload-supplying means for reconveying the surplus to the load-receiver during the making up of the next succeeding load.

8. In an automatic weighing-machine embodying a load-receiver, overload-supplying means, surplus-discharging means, and completed-load-discharging means operative in the order named, in combination with resupplying means including a rotary receiver; means operative for blocking the movement of the resupplying means during the weighing operation; and means operated by the overload-supplying means for imparting an effective movement to said resupplying means subsequently to the discharge of the completed load.

9. The combination, with weighing mechanism including a load-receiver, of overload-supplying means including an oscillatory stream-controller; overload-reducing means including an overload-reducing outlet and valve; stream-controller-actuating means operative with the weighing mechanism; means for actuating the overload-reducing valve during the weighing operation; a rotary receiver in operative relation with the overload-reducing means and adapted for receiving the overload as it is discharged from the load-receiver; a conduit for directing the material from the rotary receiver to the load-receiver; and means connecting the rotary receiver and stream-controller and adapted on each opening movement of said stream-controller for imparting a rotative movement to said rotary receiver.

10. In an automatic weighing-machine embodying a load-receiver, overload-supplying means, surplus-discharging means, and completed-load-discharging means operative in the order named, in combination with surplus-resupplying means; means controlled by the weighing mechanism for blocking the movement of the resupplying means during the weighing operation; and means operated by the overload-supplying means for imparting an effective movement to said resupplying means subsequently to the discharge of the completed load and preceding the completion of the next succeeding load.

11. The combination, with weighing mechanism including a load-receiver and with overload-supplying means including a supply-valve, of alternately-effective load-reducing means and resupplying means, the former of which includes a valve operative on the descending movement of the load-receiver, and the latter of which includes a rotary auxiliary receiver; means in connection with, and operated by, the supply-valve for imparting an opening movement to the valve during the weighing operation; means operative for blocking the movement of the rotary receiver during the weighing operation; and means for imparting an effective movement to said rotary receiver on the ascending movement of the load-receiver.

12. In an automatic weighing-machine, the combination, with overload-supplying means, of a reciprocatory load-receiver having an outlet and an inlet opening between the receiving and discharging ends thereof; a horizontally-rotative auxiliary receiver; means controlled by a member of the overload-supplying means for imparting intermittent rotative movements to said auxiliary receiver; a conduit for directing material from the load-receiver to the auxiliary receiver; and a conduit for directing material from the auxiliary to the load receiver.

13. In an automatic weighing-machine, the combination, with overload-supplying means, of a reciprocatory load-receiver and a rotary surplus-receiver supported side by side for movements in relatively-intersecting planes; means operative on the descending movement of the load-receiver for discharging a portion of the contents of said receiver into the surplus-receiver; and means controlled by a member of the overload-supplying means for imparting intermittent progressive rotative movements to the auxiliary receiver whereby the surplus is returned to the load-receiver on the return of the load-receiver to its normal load-receiving position.

14. In a weighing-machine, the combination, with stream-supplying means including an oscillatory valve, of a vertically-reciprocatory load-receiver and a horizontally-rotative auxiliary receiver reciprocally effective at predetermined points in the movements of the weighing mechanism for alternately supplying material to one another, and means operated by the valve for imparting intermittent advancing rotative movements to the surplus-receiver.

15. The combination, with weighing mechanism including a reciprocatory bucket having a surplus-receiving conduit and a surplus-discharging conduit located intermediate the receiving and discharging ends of said bucket, and with overload-supplying means, of an auxiliary receiver supported, for progressively-advancing rotative movements in a plane intersecting the path of oscillation of the bucket, between the ends of the two conduits, and adapted for receiving material from one conduit and for intermittently returning the same in definite quantities to the other conduit, and means actuated by a member of the overload-supplying means for intermittently imparting progressive advancing movements to the auxiliary receiver at predetermined points in the reciprocatory movements of the bucket.

16. The combination, with weighing mechanism including a reciprocatory bucket having two conduits communicating with the interior thereof and located one above the other, of a rotative transferring-receiver supported between the outer ends of said conduits; means in connection with the upper conduit for controlling the supply to the transferring-receiver; means for supplying an overload to the bucket; and means controlled by the overload-supplying means for rotating the transferring-receiver.

17. The combination, with weighing mechanism including a reciprocatory bucket having two conduits in communication with the interior thereof and located one above the other, of overload-supplying means including an oscillatory valve located above the bucket; a horizontally-rotatable transferring-receiver supported between the outer ends of the two conduits and having discharge-openings adapted for successively communicating with the receiving-conduit; a valve operable on the reciprocatory movements of the bucket for controlling the supply of material from the bucket to the rotative receiver; and means operatively connecting the transferring-receiver and overload-supply valve and effective on the opening movement of said valve for imparting a rotative movement to said receiver.

18. The combination, with weighing mechanism including a reciprocatory bucket having a surplus-discharger and a surplus-receiver located intermediate the receiving and discharging ends thereof, of overload-supplying means including an oscillatory supply-valve; a surplus-receiver movably supported adjacent to the receiver and discharger and having a series of separated compartments; and means in connection with and operable by the supply-valve for actuating the receiver to bring successive compartments into operative relation with the surplus-discharger and surplus-receiver of the bucket.

19. The combination, with weighing mechanism including a reciprocatory bucket having a surplus-discharger and surplus-receiver located intermediate the main receiving and discharging ends thereof, of overload-supplying means controlled by the weighing mechanism; a surplus-discharging receiver rotatably supported adjacent to the surplus discharger and receiver of the bucket and having a series of separated compartments so disposed with relation to the surplus discharger and receiver that during the rotation of said transferring-receiver diametrically opposite compartments will be simultaneously brought into vertical alinement with the surplus-discharger and surplus-receiver; and means controlled by the overload-supplying means for rotating the transferring-receiver.

20. In a weighing-machine, the combination of a rotary multicompartment surplus-receiver; a reciprocatory bucket having a surplus-discharge conduit the outer end of which is located above and at one side the axis of the surplus-receiver, and also having a surplus-receiving conduit the outer end of which is located below and at one side the axis of said rotary receiver, and which conduits are located between the main receiving and discharging ends of said buckets; a valve in connection with the surplus-discharge conduit and operative on the descent of the bucket for controlling the surplus supplied to the rotary receiver; overload-supplying means located above the bucket and including an oscillatory stream-controller; and rotary-motion instrumentalities connecting the rotary surplus-receiver and said stream-controller.

21. The combination, with a load-receiver, of two angular closers pivotally supported at their lower ends below, and opposite sides respectively of, the longitudinal axis of the load-receiver, the construction and organization of said closers being such that during the opening movement the material-supporting portions of said closers will move outwardly and downwardly in arcs intersecting at a point below the load-receiver.

22. The combination, with a load-receiver having relatively-oblique bottom walls, of two oppositely-disposed closers pivotally supported at their lower ends below the load-receiver and having material-supporting plates which, when the closers are in their closed positions, lie in relatively-oblique planes, and also having depending regulator portions which diverge relatively to each other in curved lines.

23. The combination, with a load-receiver, of two oppositely-disposed closers pivotally supported below, and at opposite sides of, the longitudinal axis of the load-receiver; a shaft mounted on the load-receiver and having a counterweighted closer-shutting arm; oppositely-disposed crank-arms fixed to said shaft; and closer-sustaining links pivotally connected at their inner ends to said arms and at their outer ends to the upper ends of said closers.

24. The combination, with a load-receiver having a discharge-opening, of two closers pivotally supported below said receiver in such manner that an opening movement of the closer will increase the effective material-supporting area of said closers without effecting a change in the distance between the discharge ends of said closers.

25. The combination, with a load-receiver, of two closer-supporting brackets fixed to said load-receiver at opposite sides and extending below the discharge end thereof; two oppositely-disposed angular closers pivotally supported at their extreme lower ends on said brackets at opposite sides, respectively, of the longitudinal axis of the load-receiver and having vertically-disposed curved regulator-plates and inclined material-supporting plates; a closer-actuator carried by the load-receiver; and means connecting the closer-actuator and closer.

26. The combination, with weighing mechanism including a load-receiver and with a supply apparatus including a valve, of a counterweighted auxiliary beam operative with the weighing mechanism; a throw-out lever normally supported at one end on said beam; a hand-lever fixed to a crank-shaft journaled on the framework and having a crank-arm pivotally connected to the opposite ends of said throw-out lever and adapted for throwing said lever out of engagement with the auxiliary beam; and thrust members connecting said throw-out lever with the valve.

FRANCIS H. RICHARDS.

Witnesses:
HENRY BISSELL,
WM. H. BLODGETT.